(12) United States Patent
Berger et al.

(10) Patent No.: US 8,907,249 B2
(45) Date of Patent: Dec. 9, 2014

(54) WELDING TORCH WITH A FIXING ELEMENT FOR THE GAS NOZZLE, SAID ELEMENT BEING CAPABLE OF EXTENSION; PROCESS CONTROL METHOD FOR A WELDING SYSTEM EQUIPPED WITH SAID WELDING TORCH; GAS NOZZLE FOR SAID WELDING TORCH; AND CONTACT TUBE FOR SAID WELDING TORCH

(75) Inventors: Ewald Berger, Wels (AT); Gerhard Miessbacher, Wels/Thalheim (AT); Harald Nöbauer, Piberbach (AT); Manfred Rü hrnössl, Linz (AT); Herbert Staufer, Neuhofen an der Krems (AT); Markus Steinmaurer, Kremsmünster (AT)

(73) Assignee: Fronius International GmbH, Pettenbach (AT)

( * ) Notice: Subject to any disclaimer, the term of this patent is extended or adjusted under 35 U.S.C. 154(b) by 1287 days.

(21) Appl. No.: 11/990,683

(22) PCT Filed: Sep. 6, 2006

(86) PCT No.: PCT/AT2006/000368
§ 371 (c)(1),
(2), (4) Date: Feb. 19, 2008

(87) PCT Pub. No.: WO2007/028185
PCT Pub. Date: Mar. 15, 2007

(65) Prior Publication Data
US 2009/0050609 A1    Feb. 26, 2009

(30) Foreign Application Priority Data
Sep. 9, 2005    (AT) .................. A 1481/2005

(51) Int. Cl.
*B23K 9/28* (2006.01)
(Continued)

(52) U.S. Cl.
CPC ............... *F16J 15/46* (2013.01); *B23K 9/325* (2013.01); *F23D 2211/00* (2013.01);
(Continued)

(58) Field of Classification Search
CPC .............. B23K 9/00; B23K 9/16; B23K 9/28; B23K 9/29; B23K 15/00; B23K 26/12; B23K 26/14
USPC ............... 219/121.11, 121.5, 121.63, 121.64, 219/121.74, 130, 137.31, 137.41, 137.44, 219/137.61, 137.63, 137.9
See application file for complete search history.

(56) References Cited

U.S. PATENT DOCUMENTS 2,872,563 A * 2/1959 Thorp ........................ 219/75
3,222,076 A  12/1965 Staunton
(Continued)

FOREIGN PATENT DOCUMENTS

EP  0 443 703  8/1991
EP  1 388 389  2/2004
(Continued)

OTHER PUBLICATIONS
International Search Report.
(Continued)

*Primary Examiner* — Brian Jennison
(74) *Attorney, Agent, or Firm* — Collard & Roe, P.C.

(57) ABSTRACT

The invention relates to a single- or multi-wire welding torch (6), more specifically to a laser-hybrid single- or multi-wire welding head provided with the welding torch (6) which can be connected to a welding device via a hose pack and consists of several parts such as a torch handle, a tubular welding torch housing, a contact housing, a contact tube for each welding wire (21*a*, 21*b*), a gas nozzle (2) etc., wherein an internal insert (28) for receiving the contact tube(s) (20*a*, 20*b*) and the gas nozzle (2) is mounted in an end area of the welding torch housing. A fixing element (30) made at least partially of a flexible material is placed on the internal insert (28) or on the housing (2) for producing as required an, in particular, gas-tight connection between said internal insert (28) and the gas nozzle (2) pushed thereon. This connection can be established by the spatial extension of the fixing element. A method for the process control of a robot welding system, a gas nozzle cap and a gas nozzle (2) for a welding torch (6) are also disclosed.

16 Claims, 7 Drawing Sheets

(51) Int. Cl.
*B23K 9/32* (2006.01)
*F16J 15/46* (2006.01)
*F23D 14/54* (2006.01)
*B23K 26/14* (2014.01)
*B23K 9/173* (2006.01)
*B23K 9/29* (2006.01)

(52) U.S. Cl.
CPC ............ *F23D 14/54* (2013.01); *B23K 26/1476* (2013.01); *B23K 9/1735* (2013.01); *B23K 26/1429* (2013.01); *B23K 9/295* (2013.01)
USPC ................................ 219/137.31; 219/137.41

(56) References Cited

U.S. PATENT DOCUMENTS

| | | | |
|---|---|---|---|
| 3,591,963 | A | 7/1971 | Kopp |
| 3,659,076 | A | 4/1972 | Ogden, Sr. |
| 3,746,833 | A | 7/1973 | Ujiie |
| 3,783,233 | A | 1/1974 | dal Molin |
| 4,645,901 | A | 2/1987 | Scholz et al. |
| 4,675,493 | A * | 6/1987 | Gartland et al. ............... 219/74 |
| 4,839,490 | A | 6/1989 | DeSaw |
| 5,124,525 | A * | 6/1992 | Severance et al. ......... 219/121.5 |
| 5,511,573 | A | 4/1996 | Corte |
| 6,023,043 | A | 2/2000 | Manabe et al. |
| 6,078,023 | A | 6/2000 | Jones et al. |
| 6,844,521 | B2 | 1/2005 | Staufer et al. |
| 6,852,950 | B2 | 2/2005 | Giese |
| 7,230,203 | B2 | 6/2007 | Wimroither et al. |
| 2003/0029851 | A1 | 2/2003 | Suzuki et al. |
| 2004/0026388 | A1* | 2/2004 | Staufer et al. ............ 219/121.78 |
| 2005/0046180 | A1 | 3/2005 | Tombler, Jr. et al. |
| 2006/0151453 | A1* | 7/2006 | Gordon et al. ............ 219/137.61 |
| 2007/0145028 | A1 | 6/2007 | Artelsmair |

FOREIGN PATENT DOCUMENTS

| | | |
|---|---|---|
| GB | 1 450 912 | 9/1976 |
| JP | 52-133844 | 11/1977 |
| JP | 57-039081 | 3/1982 |
| JP | 57-189939 | 6/1984 |
| JP | 62-013273 | 1/1987 |
| JP | 05-077044 | 3/1993 |
| JP | 05-096376 | 4/1993 |
| JP | 05-220574 | 8/1993 |
| JP | 11-347737 | 12/1999 |
| JP | 2000-024779 | 1/2000 |
| JP | 2004-074285 | 3/2004 |
| JP | 2005-140164 | 6/2005 |
| JP | 2005-240883 | 9/2005 |
| WO | WO 93/14335 | 7/1993 |
| WO | WO 01/38038 | 5/2001 |
| WO | WO 01/62424 | 8/2001 |
| WO | WO 02/40211 | 5/2002 |
| WO | WO 2004/052581 | 6/2004 |
| WO | WO 2005/056228 | 6/2005 |

OTHER PUBLICATIONS

European Search Report dated Jun. 19, 2009 with an English translation of the relevant parts.
European Office Action dated Jul. 23, 2009 with an English translation of the relevant parts.
Japanese Examination Report dated Jun. 14, 2011 in JP 2008-529414 with English translation.
Japanese Examination Report dated Jan. 29, 2013 in Japanese Application No. 2008-529414 with English translation.
Japanese Examination Report dated Jan. 29, 2013 in Japanese Application No. 2011-198608 with English translation.

* cited by examiner

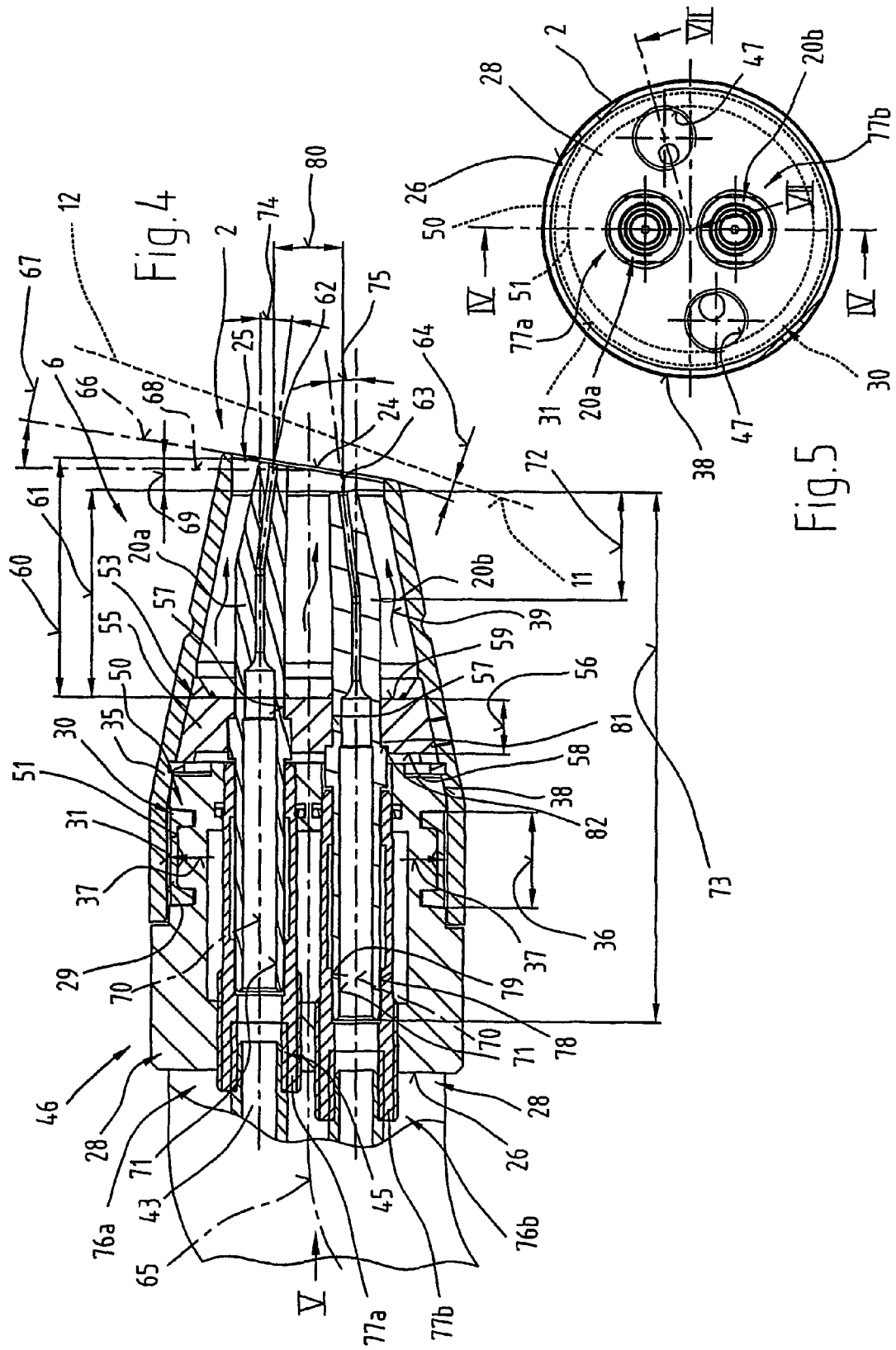

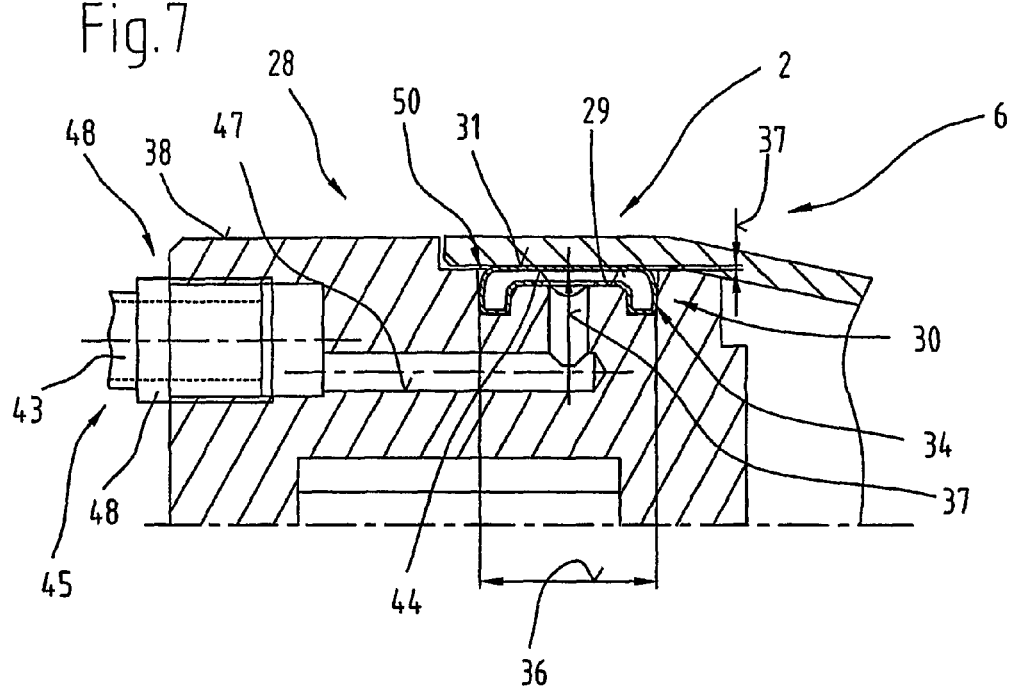
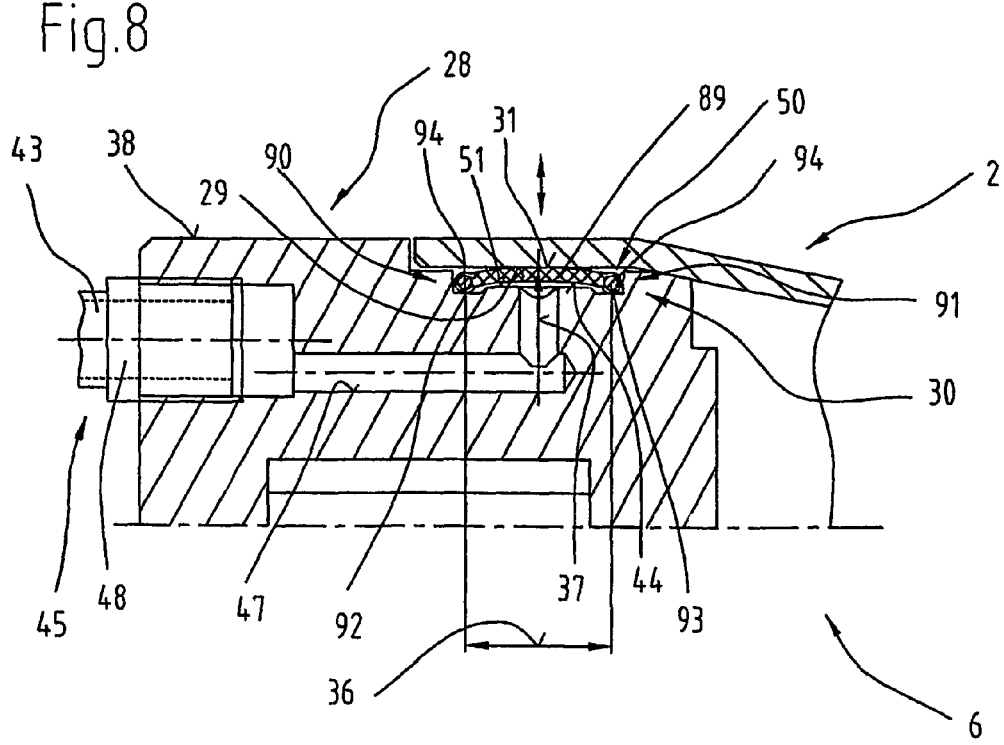

Fig. 9
Fig. 10
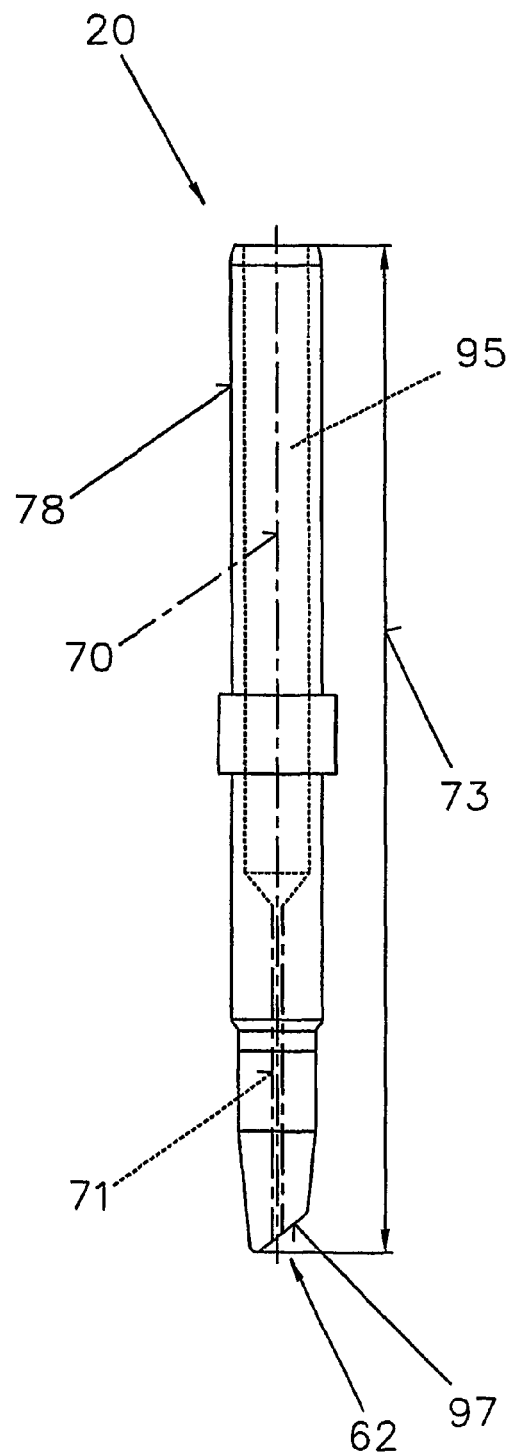
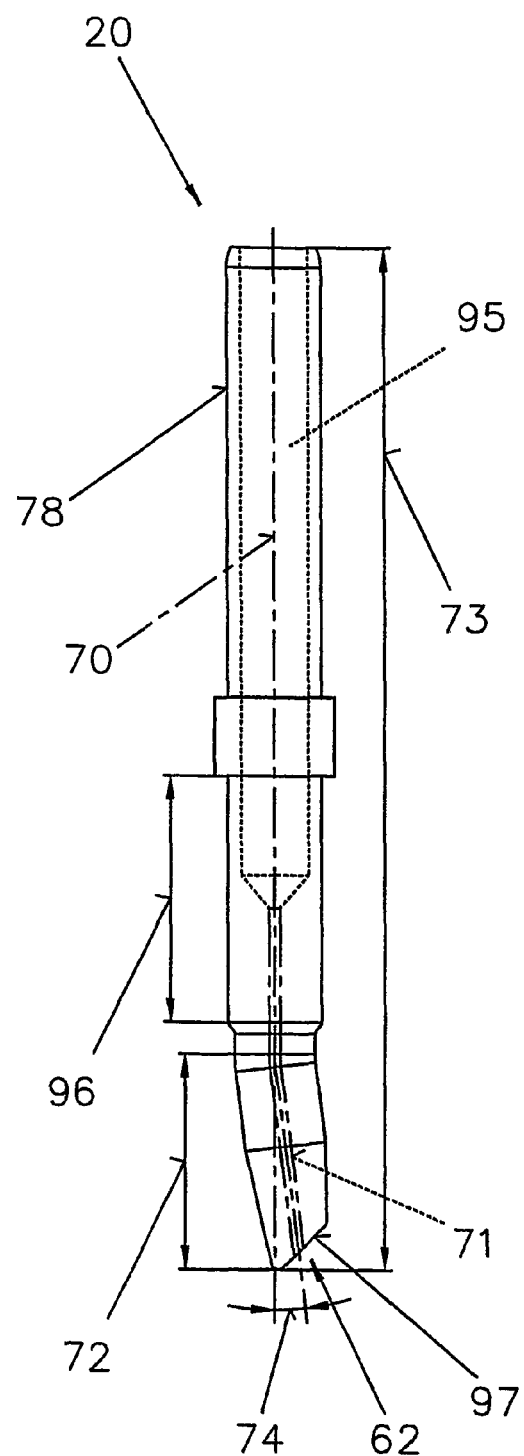

WELDING TORCH WITH A FIXING ELEMENT FOR THE GAS NOZZLE, SAID ELEMENT BEING CAPABLE OF EXTENSION; PROCESS CONTROL METHOD FOR A WELDING SYSTEM EQUIPPED WITH SAID WELDING TORCH; GAS NOZZLE FOR SAID WELDING TORCH; AND CONTACT TUBE FOR SAID WELDING TORCH

CROSS REFERENCE TO RELATED APPLICATIONS

Applicants claim priority under 35 U.S.C. §119 of Austrian Application No. A 1481/2005 filed Sep. 9, 2005. Applicants also claim priority under 35 U.S.C. §365 of PCT/AT2006/000368 filed Sep. 6, 2006. The international application under PCT article 21(2) was not published in English.

The present invention relates to a single or multi-wire welding torch which can be connected to a welding device via a hose pack and consists of several components such as a torch handle, a tubular welding torch housing, a contact tube for each welding wire, a gas nozzle, etc., wherein an internal insert for receiving said one or more contact tube(s) and said gas nozzle is mounted in an end area of said welding torch housing. The present invention also relates to a laser-hybrid single or multi-wire welding head wherein components such as a laser or a laser lens system, a crossjet and welding torch components for arc welding are provided on at least one mounting element, said components being connected to a laser beam source and a welding device for melting wire welding processes via leads. Moreover, the present invention relates to a single or multi-wire welding torch, e.g. for laser-hybrid welding, having components for arc welding with melting welding wire, with said one or more components being formed by a contact tube having a throughout guiding bore having a longitudinal central axis to guide each welding wire. Furthermore, the present invention relates to a method for the process control of a robot welding system having a control device and a welding torch, particularly for laser-hybrid welding, mounted on a robot arm, said welding torch being provided with a gas nozzle in the area of a welding wire exit.

In addition, the present invention relates to a gas nozzle for a welding torch, particularly for a laser-hybrid welding head, having a tubular housing with an exit opening for a welding wire and, opposite, a receiving area for mounting on an internal insert of said welding torch, and it also relates to a gas nozzle for a multi-wire welding torch having a number of contact tubes, particularly for a laser-hybrid welding head, said gas nozzle having a tubular housing extending along a central longitudinal axis and having an exit opening for a welding wire on a first front surface and, opposite, on a second front surface a receiving area for mounting on an internal insert of said welding torch.

Welding devices and welding processes for melting electrodes, e.g. MIG/MAG welding processes, are known from prior art. Systems and processes for welding using laser beams are known, too. Combinations of these processes, known as laser-hybrid processes, using appropriate devices are also known and widely used.

For example, prior art devices for laser-hybrid welding processes are known from WO 02/40211 and WO 01/38038. These welding devices, however, have some disadvantages, primarily when using multi-wire welding torches, because the gas nozzle does not take into account the special conditions arising from the use of multiple welding wires with respect to torch distance, stick-out lengths, etc. This may cause problems for welding process control.

Such known welding devices are used intensively in the automated production industry in the form of computer-controlled robot welding systems. In such systems, the welding torch is guided along the points of connection on a work piece by a robot arm. The welding process produces depositions on the gas nozzle and the contact tube of the welding torch in the welding wire exit area caused by welding spatters, contact welding between welding wire and contact tube, etc. Therefore, it is necessary to regularly maintain and clean the welding wire exit area of the welding torch to ensure the welding process to proceed undisturbed. For maintenance, the contact tubes, which provide an electric connection to the welding wire, and optionally further parts, e.g. the gas nozzle, are manually exchanged by maintenance personnel. Such personnel have to dismount the usually screwed-in contact tubes and the screwed-on gas nozzle one by one and remount the new ones. This has proven very disadvantageous and costs a lot of money and time, because it requires entire production lines to come to a standstill.

The object of the present invention is to improve welding processes and particularly the necessary maintenance procedures and make them more efficient, and to provide the suitable welding torch components for this purpose.

The object of the present invention is achieved by a fixing element arranged on the internal insert or on the gas nozzle to provide a particularly gas-tight connection, if necessary, between the internal insert and the gas nozzle pushed thereon. Said fixing element is at least partially made of flexible material, with said connection being establishable by spatial expansion of said fixing element.

This embodiment is advantageous because the use of an expandable fixing element, which allows mounting of said gas nozzle as well as gas-tight sealing of the connection, allows easy detachment or attachment of said gas nozzle by activating or deactivating said fixing element. The condition of said expandable fixing element may be easily determined by means of various actuating or supply devices by control signals from a welding device control device or the robot control unit. This allows automation of the welding torch maintenance and cleaning process, because the gas nozzle may be exchanged fully automatically. Thus, welding torch maintenance times may be minimized and production will become more efficient. Moreover, no maintenance personnel is required. Optionally, maintenance intervals may be shortened due to shorter maintenance times, so that wear and soiling of the gas nozzle and the contact tubes may be reduced because the components are used for a shorter period of time.

A further embodiment is advantageous because the fixing element is attached to the internal insert in a defined position. Moreover, when the fixing element is deactivated, it may be completely received in the recess, so that the gas nozzle may be pushed onto the internal insert over the recess, and then the fixing element may be expanded to secure the gas nozzle.

A fixing element arrangement according to one embodiment is particularly cost-efficient and effective, because an elastic hose may easily be expanded by airing its interior, so that the contact surface of the hose is forced against the gas nozzle to provide a connection. An appropriate embodiment of the hose is also described in herein.

A further embodiment is advantageous, too, wherein the fixing element is formed by a membrane, because such membrane requires only little space in the gas nozzle or in the internal insert and functions very well.

In a further welding torch embodiment, the condition of the fixing element may be determined simply and reliably by the supply device, causing only little costs and requiring only few movable parts, i.e. requiring only little maintenance effort and expenses. Particularly efficient further developments are also described in herein.

In a further embodiment, components of the crossjet may be used as the supply device, which is provided in a laser-hybrid welding device anyway, allowing cost-efficient and compact design of the welding torch of a laser-hybrid welding head.

A further welding torch embodiment proves advantageous because the gas nozzle is held firmly by a non-positive connection, which is preferably uninterrupted around the entire circumference of the internal insert, and said connection is also gas-tight, rendering special sealing elements and the like unnecessary. A further embodiment may additionally have features to improve the connecting properties.

A further embodiment is advantageous, too, because it prevents current from running to welding torch components accessible from the outside, which may be dangerous. By means of the contact socket(s), current may be conducted inside the internal insert without risk, and it may be conducted via a large surface with little loss and without sparks by accurate-to-size reception of the contact tubes.

A further embodiment is advantageous because push-on contact tubes may be easily removed from and mounted on a welding torch, allowing maintenance of said welding torch to be automatized very easily. For example, the contact tube(s) may be exchanged by pulling it/them out of the contact socket(s) and inserting a new contact tube into each contact socket.

The provision of a sensor is advantageous because welding processes may be regulated and maintenance may be started flexibly depending on individual material wear or soiling. Moreover, it is possible to check whether the gas nozzle or the contact tube(s) are mounted correctly on or are removed from the internal insert.

Making the internal insert of two semi-spheres or of a number of individual parts proves advantageous for production and mounting of the internal insert.

A welding torch with a gas nozzle as described herein provides further advantages over the prior art.

Furthermore, the object of the present invention is independently reached by a design wherein a longitudinal central axis of a guiding bore of at least one contact tube is curved in at least one section of the contact tube length.

Advantageously, in this embodiment, the point of exit of the welding wire may be arranged eccentrically with respect to the wire course in the back area or the central axis of the welding torch. This allows influencing the position of exit of the welding wire from the contact tube, which is advantageous if the welding torch is held at an angle, because the direction of exit of the welding wire is changed so that it may be moved out of the contact tube towards the melting bath on the work piece while maintaining optimum stick-out length. This embodiment is particularly advantageous for multi-wire welding torches having a number of curved contact tubes, because the distances between the welding wire exits between the contact tubes may be adjusted. Moreover, the welding wires, which are naturally spaced apart in a welding torch, may exit the contact tube in a non-parallel fashion, i.e. at a certain angle with respect to each other, so that these wires may be guided to a defined area of a common melting bath although they are spaced apart in the welding torch. This allows optimized and optionally individualized supply of several welding wires, i.e. optimized melting volume, for a cutting process. Another advantage is that contact with the welding wire is very good because the contact tube is curved, resulting in precise current conduction.

Moreover, a flowing radius forms due to the curve, so that the welding wire is easily inserted, while it is not easy to insert the welding wire when the tube has a knee as known from prior art, because the knee may block the welding wire. In this embodiment, the welding wire bore is preferably bigger than in conventional contact tubes. For example, for a welding wire having a cross section of 1.2 mm, the bore will have a diameter of 1.4 mm to 2 mm. Thus, the contact tube will close up less easily.

Cutting the contact tube at an angle provides an oval exit opening (i.e. the exit is less prone to closing up) and a smaller area of spatter attacks. Preferably, the exit opening is beveled by 40° to 700 with respect to the central axis.

For fixing, lamellae are provided inside the contact socket.

A curved or angular contact tube having a guiding bore shaped as an arc or angle in the area of exit of the welding torch is an easily produced and effective embodiment to achieve the aims mentioned in the above paragraph.

In addition, an embodiment with a section of the axis of the guiding bore being curved at an angle has proven advantageous, and a contact tube having an angle in the end area is particularly easy to produce.

A further embodiment is advantageous, too, because it includes a rotatable contact tube having a curved longitudinal central axis in the welding wire exit area and allows easy determination of the direction of exit of the welding wire from the contact tube by simply twisting said contact tube. This also allows determination of distances between several welding wires. The setting of the position of the curved contact tube thus provides a new parameter for controlling the welding process, because e.g. the arc course, the stick-out length, and the melting rate may be changed in the welding process.

A pluggable contact tube is advantageous because such contact tube is also rotatable if sliding friction acts on it.

Combinations of contact tubes and welding torches as described herein also provide advantageous embodiments.

Another independent way to achieve the objects of the present invention is defined with an embodiment, wherein in an inner space of a housing of the gas nozzle a receiving element for one or more contact tube(s) is provided, with said receiving element electrically insulating the contact tube(s) against each other and against the housing. The object of the present invention is also achieved independently by a gas nozzle cap having a gas nozzle having a receiving element wherein one or more contact tube(s) are arranged which form a modular unit together with the gas nozzle.

A gas nozzle or gas nozzle cap of such shape advantageously allow mounting one or more contact tube(s) inside the housing. Thus, the contact tube(s) form one common structural or mounting unit, allowing particularly easy maintenance or cleaning of the gas nozzle and the contact tube(s) that requires only few process steps and may easily be automatized.

It is practical to give the receiving element the shape of a plate or disc, because this will provide a compact insert for the gas nozzle. A design in which both the two front surface end areas of each contact tube project from the receiving element is advantageous, too.

Further embodiments describe advantageous, and simple ways to mount contact tubes in the receiving element.

The characteristic features of push-in connection means, such as e.g. an elastically deformable holding arm, prove to save space and material.

A further embodiment allows the gas nozzle to be in a defined position on the internal insert so that the components inside said internal insert are in their correct positions with respect to each other, allowing a smooth process. Moreover, a positioning element advantageously prevents unintentional distortion of the gas nozzle mounted on the internal insert.

A further embodiment may prove advantageous, wherein the supply device for the fixing element does not belong to the welding system but is located in a maintenance area where the gas nozzle or the contact tubes are exchanged. When the gas nozzle is mounted on the internal insert, said fixing element may be activated by such an external supply device, thus providing a connection to the internal insert until the fixing element is deactivated when the gas nozzle is removed. Moreover, positioning the fixing element inside the gas nozzle may have a spatially positive effect on the torch design in certain welding torches.

A further independent way to achieve the objects of the present invention with respect to a gas nozzle is to have the first front surface of the housing beveled in the exit opening area with respect to the longitudinal central axis according to a plane extending from an outer welding wire exit of a first contact tube in the direction of a further welding wire exit of a further contact tube, which exit recesses in the direction of said longitudinal central axis in the direction of said second front surface.

This gas nozzle design will make any multi-wire welding process considerably more efficient and less problem-prone because when using a number of contact tubes, the gas nozzle will take into account the different distances between the wire exits and the melting bath. If the welding torch is held at an angle, the welding wire exits may thus be positioned very close or essentially in one plane parallel to the work piece surface, thus allowing optimum process behavior when using several melting wires as electrodes.

A further embodiment in which the plane forms an angle with a normal plane orthogonal to the axis is particularly advantageous because particularly good welding connections may be achieved holding the torch conventionally at an angle with respect to the work piece.

Gas nozzles having various combinations of the features described herein also provide advantageous embodiments.

The method for the process control of a welding system is also an independent way to achieve the objects of the present invention, wherein a maintenance procedure of the welding process is started at fixed times or depending on process parameters detected by sensors, during which procedure the welding torch is positioned in a maintenance position, then a connection between the gas nozzle and an internal inset of the welding torch is disconnected by spatial reduction in size of a fixing element of the welding torch, and the gas nozzle is removed from the welding torch. Subsequently, another gas nozzle is positioned on said welding torch and a particularly gas-tight connection is provided between the gas nozzle and the internal insert of the welding torch by spatial expansion of said fixing element.

Such method considerably simplifies welding torch maintenance, and such maintenance is particularly easily carried out automatically by a robot system as explained in detail herein.

Further process steps described herein allow easy positioning of the welding torch at defined coordinates of robot control, so that gas nozzles placed in the respective positions may be mounted on the welding torch automatically. Advantageous methods for controlling fixing of the gas nozzle are also described herein.

The present invention will now be described in greater detail using the attached schematic drawings, wherein FIG. 1 is a side view of a laser-hybrid welding head of a robot welding system;

FIG. 4 is a longitudinal section according to line IV-IV in FIG. 5 of an embodiment of a multi-wire welding torch having a fixing element in the gas nozzle area;

FIG. 5 is a front view according to arrow V in FIG. 4 of a welding torch internal insert with attached gas nozzle;

FIG. 7 is a section according to line VII-VII in FIG. 5 through one half of a welding torch having a fixing element in the form of an expandable hose;

FIG. 8 is a section through one half of another embodiment of a welding torch and a gas nozzle wherein the fixing element is formed by a membrane;

FIGS. 9 and 10 are contact tubes, simplified and blown up.

The invention will now be explained in greater detail using the laser-hybrid welding head 1 according to FIG. 1. However, it must be noted that the present invention may also be applied to single or multi-wire welding torches exclusively designed for arc welding with melting electrode, particularly MIG/MAG torches.

Figure 1:
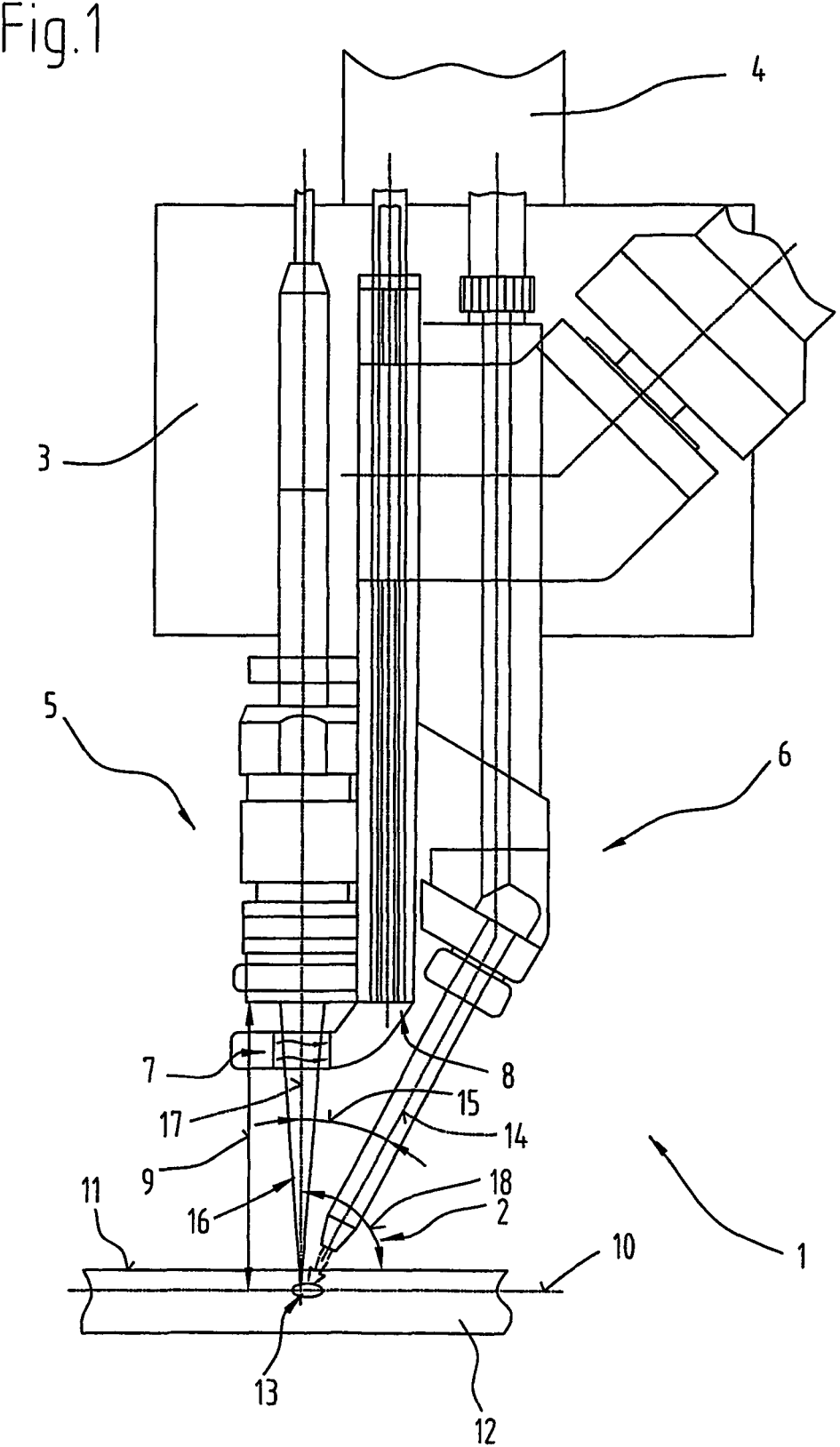

FIG. 1 shows a laser-hybrid welding head 1 for combined laser and arc welding processes. It has a gas nozzle 2 required for arc welding.

The present laser-hybrid welding head 1 uses commercially available prior art elements and components and combines them in a special way. These elements or components are arranged on at least one mounting plate 3 connected to a robot, particularly a robot arm 4 (schematic representation). Said elements or components may be formed by a laser 5 or an optical focusing unit for said laser 5 and a welding torch 6 having a gas nozzle 2 for arc welding. The welding torch is connected to a welding device (not shown in detail) via a hose pack, said welding device having components such as a current source, a control device, operating elements, a wire feeder, etc. A further element or a further component may be formed by a crossjet 7 assigned to said laser 5 or said optical focusing unit, and a diverting device 8 is assigned to said crossjet.

Said laser 5 or said optical focusing unit has a focal distance 9, particularly a focal length of said laser 5 or said optical focusing unit of e.g. 50 to 400 mm from a definition plane 10 or a surface 11 of a work piece 12. Said definition plane 10 is formed by said focal distance 9 or by said focal length, and said surface 11 of said work piece 12 is aligned identically with it, or a focus point 13 forming said focal distance 9 is arranged outside or inside said work piece 12. The examples of FIGS. 1 and 2 show an arrangement wherein said focus point 13 is arranged below the surface 11 of the work piece 12, i.e. said focus point 13 is arranged or aligned inside said work piece 12.

The other arrangements of the other elements or components with respect to each other are essential for a welding process to be carried out in very high quality. In the present example, said welding torch 6, particularly a longitudinal central axis 14 extending lengthwise along said welding torch 6, is arranged at an angle 15, which is e.g. between 25° and 35°, with respect to said laser 5 or said optical focusing unit, particularly with respect to a laser axis 17 extending in the center of a laser beam 16, said laser axis 17 having an angle 18 of between 80° and 100°, preferably 90°, with respect to said definition plane 10 and/or said surface 11 of said work piece 12.

Figure 2:
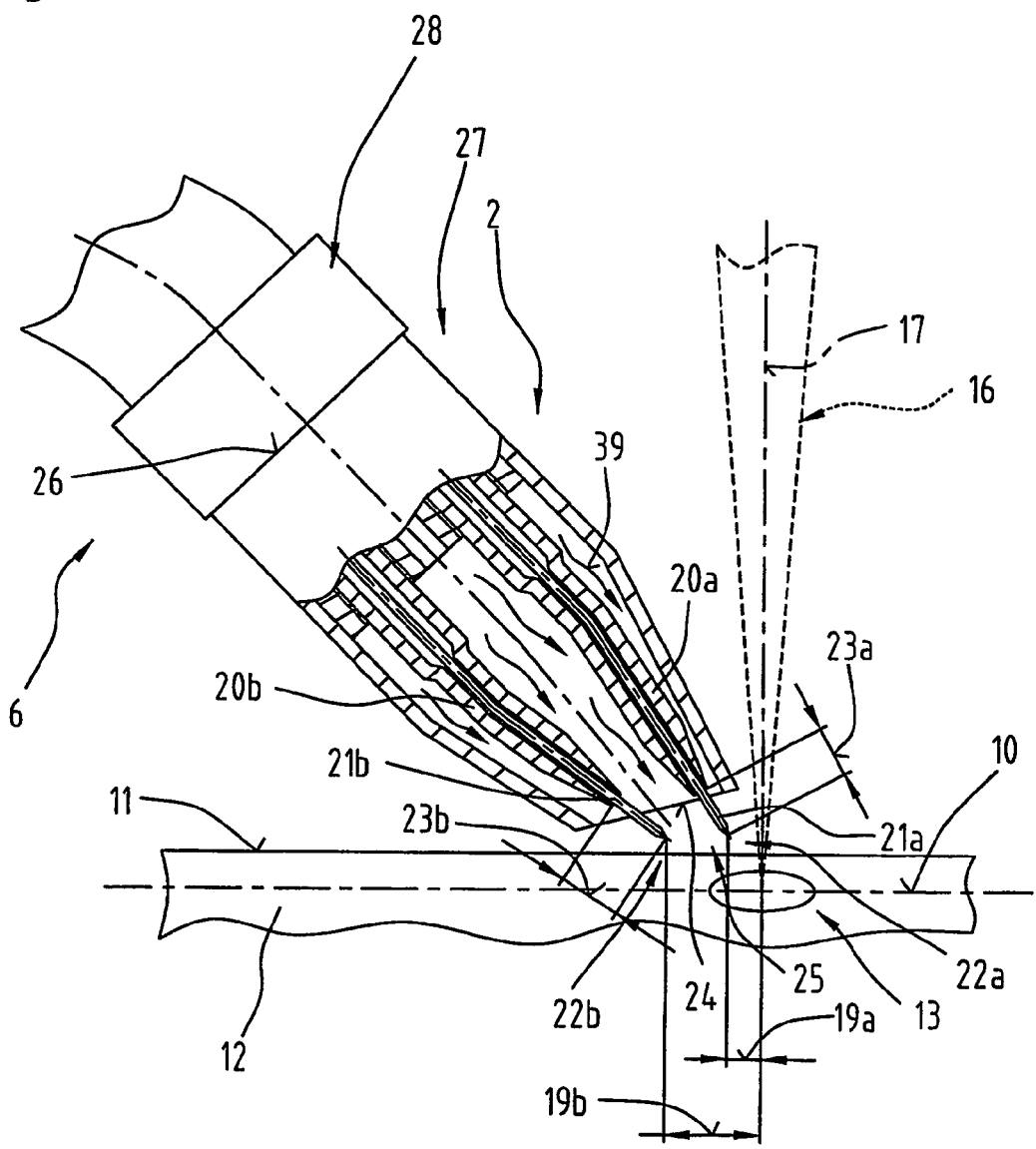
FIG. 2 is a simplified detailed view of the welding torch gas nozzle area in the arrangement of FIG. 1.

The embodiments of FIGS. 1 and 2 show the work piece 12 in a horizontal position. If, however, the position of said work piece 12, particularly the position of its surface 11, is changed during a welding process, it will be necessary for said laser 5, particularly said laser axis 17, to be arranged with respect to said surface 11 in such a way that said angle 18 is between 80° and 100°, preferably 90°.

This is easily achieved by programming the welding path of the robot, particularly said robot arm 4, correspondingly so that the individual components will always be in the same positions, distances and angles with respect to each other. Thus, said laser axis 17 will always have the same pre-set angle 18 with respect to said surface 11 of said work piece 12.

FIG. 2 shows that a welding wire 21 exiting from a welding torch 6 or from a contact tube 20 is at a distance 19 of from the laser beam 16 emitted by the laser 5 or the optical focusing unit, particularly by the laser axis 17 extending through the center of said laser beam 16. Generally, it should be mentioned that the indices a and b used in the figures denote similar parts provided multiply in the welding torch, but these similar parts need not necessarily be completely identical in configuration. This e.g. applies to the two contact tubes 20a, 20b, and the distances 19a, 19b provided in duplicate in the present example. These indices may hereinafter be omitted if they are not essential for understanding.

The double-wire welding torch 6 shown in the drawing has two distances 19a and 19b, which are different. However, the welding wires 21a and 21b exiting the contact tubes 20a and 20b stand in such directions with respect to each other as to form a common melting bath in which the laser beam 16 is involved, too. Therefore, in a welding process a common welding bath and a common welding plasma are formed, which, however, are not shown for the sake of simplicity, i.e. a laser beam 16 and the arcs act simultaneously on one welding zone or one melting bath with a common welding plasma, i.e. an inert gas envelope, with these two processes influencing and supporting each other. If the distances 19a and 19b between the welding wire ends and the laser axis 17 are selected too widely, said laser beam 16 may form its own welding bath or melting bath, which will then cool down again for the subsequent arc welding process, thus not allowing sufficient penetration, because the distance between said arcs and said laser beam are so wide that said beam does not radiate into the welding plasma of the arc welding process. Of course it is possible to relate said distances 19a, 19b not only to said welding wire ends 22a, 22b, but to also transfer said distances 19a, 19b to the arcs ignited between said welding wires 21a, 21b and said work piece 12, because they are very essential for the welding process.

However, in order to be able to relate said distances 19a, 19b to said welding wire ends 22a, 22b, said welding wires 21a, 21b each have a stick-out length 23a, 23b of preferably between 10 mm and 14 mm. The stick-out length 23a of the first welding wire 21a may be different from the stick-out length 23b of the other welding wire 21b. Said stick-out lengths 23a, 23b may be adjusted by various known methods by hand or automatically.

As the laser beam 16 is formed by a concentrated light beam having a variety of wave lengths, it is of a conical shape from said laser 5 to said focus point 13 or of a tapering shape from said laser 5 or said optical focusing unit to said focus point 13, and the highest possible output or energy density of said laser 5 is reached in said focusing point 13.

Figure 3:
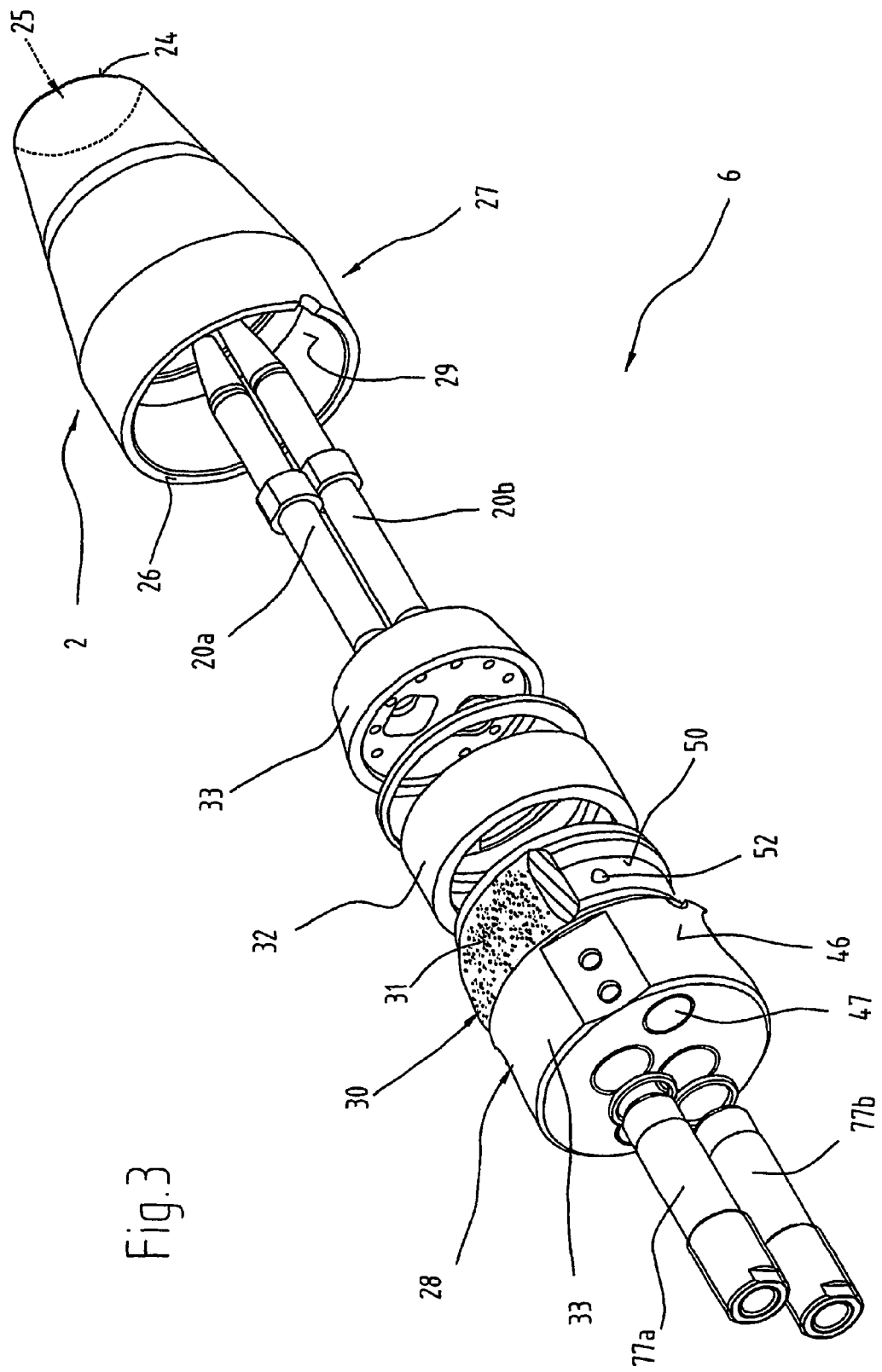
FIG. 3 is an exploded oblique view of one possible embodiment of a welding torch.

FIGS. 2 and 3 show that said gas nozzle 2 has an exit opening 25 for said welding wire 21 in the first front surface 24 area, and that said gas nozzle 2 has a receiving area 27 on a further front surface 26 for mounting on an internal insert 28 of said welding torch 6. Said receiving area 27 is essentially tubular, having a cylindrical internal surface 29.

FIG. 3 is an exploded view of said welding torch 6. A fixing element 30 is shown in said gas nozzle 2 area to detachably secure said gas nozzle 2 to said internal insert 28. A connection between said gas nozzle 2 and said internal insert 28 is provided between a contact surface 31 of said fixing element 30 and the internal surface 29 of said gas nozzle 2. The other components shown in the drawing, such as a cylindrical sealing ring 32, a gas distribution ring 33 having circularly arranged gas passage bores, a guard ring, and the like are optional and known from prior art, so they are not described in greater detail here. It must be noted, however, that in said gas nozzle 2 and/or said internal insert 28 sealing lips running all around are provided at different positions, particularly in the area of said fixing element 30. Contact sockets 77a, 77b shown in the drawing will be mentioned later.

Figure 6:
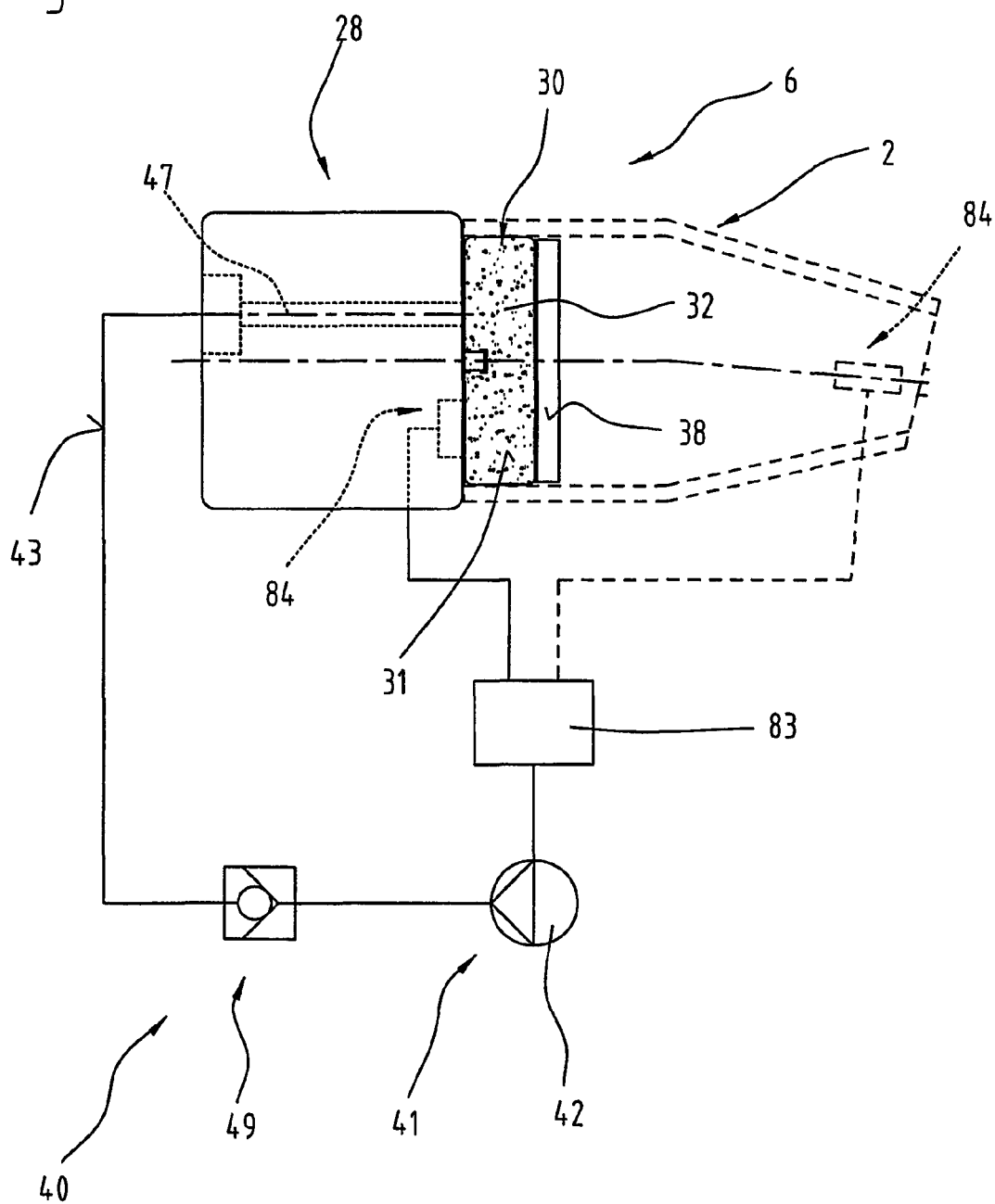
FIG. 6 is a side view of the internal insert having the fixing element and, in broken lines, the gas nozzle.

A first positioning element, particularly a recess or a projection for defined positioning of said gas nozzle 2 on said internal insert 28 may be provided on said gas nozzle 2 in the receiving area 27. In the example shown, said positioning element is provided as a recess on the front surface 26 of said gas nozzle 2. A further positioning element, e.g. a projection, is provided on said internal insert 28, which element is connected to said first positioning element. A schematic representation of such connection is shown in FIG. 6.

FIG. 4 is a longitudinal section of the gas nozzle 2 area of a welding torch 6. The fixing element 30 provided on the internal insert 28 also serves as a sealing element providing a gas-tight connection between said gas nozzle 2 and said internal insert 28. It is particularly suitable to prepare at least parts of said fixing element 30 of flexible, particularly ductile or elastic material, which means that said fixing element 30 may change the shape of its outer surface at least in parts if necessary, particularly it may become bigger or smaller. Thus, the position of a contact surface 31 of said fixing element 30 adjoining said inner surface 29 of said gas nozzle 2 to provide a connection may be changed with respect to said internal surface 29.

The state of connection between said gas nozzle 2 and said internal insert 28, particularly the strength of this connection may be determined by the shape of said fixing element 30. Said connection is preferably established by pressure forces or surface pressure between said contact surface 31 of said fixing element 30 and said internal surface 29 of said gas nozzle 2. This connection is non-positive, particularly frictional. The strength of said connection is chosen such that no forces having components coaxial with the longitudinal central axis 14, i.e. tensile forces, may be transmitted via said gas nozzle 2. Thus, said gas nozzle 2 can not be detached from said internal insert 28 when said fixing element 30 is activated. The strength of the connection may be determined by the degree of expansion of said expandable fixing element 30.

In a simple embodiment, said fixing element 30 is formed by a tubular hose 34 or a sealing element that may optionally be made of an elastic material, e.g. a rubber mixture. Such embodiment is described in greater detail with respect to FIG. 7.

Moreover, FIG. 4 shows that said gas nozzle 2 is tubular and has a housing 35 pushed on a shaft-like length section of said internal insert 28 and secured to it via said fixing element 30. In the receiving area 27 of said gas nozzle 2, said fixing element 30 is in contact with said contact surface 31 of said fixing element 20 via a section 36, and said connection is established in this very section 36. Said contact surface 31 is forced against the internal surface 29 of a housing 35 of said gas nozzle 2 by a resulting force acting in the direction of arrow 37. Consequently, this pressure connection is established by changing the position of said contact surface 31 in the direction of said arrow 37. For this purpose, said fixing element 30 is subjected to a pressure producing medium, particularly an inert gas or compressed air. Possible embodiments of said fixing element 30 as a tube 34 and as a membrane 89 are described in greater detail with respect to FIGS. 7 and 8.

FIGS. 4, 5, and 6 show that said fixing element 30 extends like a ring around an outer surface 38 of said internal insert 28. Said contact surface 31 forms a fully circumferential, tightly closed contact connection with said internal surface 29. This makes sure that an inert gas (symbolized by arrow 39), e.g. argon, helium or an active gas such as $CO_2$, streaming inside said hollow housing 35 of said gas nozzle 2 can not escape through said connection between said gas nozzle 2 and said internal insert 28.

The cross section of said fixing element 30, particularly of said hose 34, is e.g. somewhat rectangular or U-shaped so that said contact surface 31 via said section 36 is of planar shape and the area of contact with said internal surface 29 of said gas nozzle 2 is as big as possible. It is also possible to use fixing elements 30 having curved or profiled contact surfaces 31 without problems.

Said contact surface 31 of said fixing element 30 and/or said internal surface 29 of said receiving element 27 of said gas nozzle 2 may have special structures to facilitate establishment of a non-positive or frictional and/or gas-tight connection. For example, they may be rough, they may have a coating for easier adherence, or a friction lining, or micro or nano structures. Such or other suitable embodiments are known from prior art by a person skilled in the art of assembling technology.

Said fixing element 30 is effectively connected to a supply device 40 which provides a medium for activating or deactivating said fixing element 30 on demand and supplies it to said fixing element 30. In the embodiments shown in FIGS. 3 to 8 said supply device 40 is formed by a pneumatic or hydraulic pressure producer 41, particularly a pump 42 according to FIG. 6. Said pressure producer 41 is coupled to said fixing element 30 via a feed line 43 to transport flowing media. Therefore, an internal surface 44 of an elastic or deformable area of said fixing element 30 may be subjected to a medium causing said fixing element 30 to expand and said contact surface 31 to change its position.

Said feed line 43 is provided on said internal insert 28 via a coupling mechanism 45, which may e.g. be formed as a hollow cylindrical push-on or screw-on element having a sealing element, a valve or similar. Moreover, said feed line 43 may be connected directly to a hollow space of a tubular fixing element 30 via said coupling mechanism 45. In this case, said feed line 43, which is tubular, is inserted into the inside of said gas nozzle 2 or said internal insert 28, or said coupling mechanism 45 is provided on an outside 46 of said welding torch 6, and said feed line 43 is guided to said fixing element 30 from outside said gas nozzle 2 or said internal insert 28.

In the shown embodiments according to FIGS. 6 to 8, a duct 47 is provided in said internal insert 28, which duct 47, on the one hand, runs into the area of said internal surface 44 of said fixing element 30, and, on the other hand, has a flowing connection to said pressure producer 41. For example, said duct 47 is formed by one or more cylindrical bores in said internal insert 28. A bushing 48 of said coupling mechanism 45 is provided to establish connection of said duct 47 to said feed line 43, which bushing 48 preferably has a sealing element to allow establishment of a gas-tight mechanical connection.

With respect to said coupling mechanism 45 it must be noted that it is formed as a prior art coupling for sealed and detachable connection of two pressure bearing conduits. It may be a push-on, snap-on, shrink-on or screw-on connection etc. known from prior art to a person skilled in the art.

It is also possible to install only flow conduits in said welding torch 6 instead of said duct 47, e.g. flexible plastic or rubber conduits fulfilling the same function as said duct 47.

FIG. 6 shows that preferably a valve 49 is assigned to said supply device 40 or said fixing element 30 to de-gas said duct 47 or said fixing element 30. In the embodiment according to FIG. 6 said valve 49 is provided in said feed line 43 in the form of a pilot controlled check valve. Thus, said supply line 43 may be used as a common go-and-return conduit, because when de-gassing, said valve 49 may be de-blocked and any excessive pressure acting on or in said fixing element 30 may be relieved, thus disconnecting the connection via said fixing element 30. Such valve 49 also has the advantage that said pressure producer 41 only needs to be in operation for activating said fixing element, e.g. to pump up said hose 34, and when sufficient pressure is applied, it will be upheld by said check valve without requiring activation of said pressure producer 41.

Of course it is also possible to have embodiments wherein special de-gassing devices or individual go and return conduits are provided for said fixing element 30, rendering a check valve unnecessary.

In a particularly advantageous embodiment said supply device 40 for a laser-hybrid welding process is a compressed-air device. The laser-hybrid welding head 1 has a crossjet 7 as mentioned above, which is essentially a beam of compressed air flowing transversely with respect to the laser lens system and protecting said laser lens system from soiling. Thus, the compressed air supply for said crossjet 7, which is provided in the laser-hybrid welding head 1 anyway, may also be used as a supply device 40 for said fixing element 30 as described above. In such embodiment it is not definitely necessary to provide a special pressure producer 41 for said fixing element 30, but the flow of said crossjet compressed air device may be connected to said fixing element via a conduit. A control valve may be assigned to this flow connection to control the state of said fixing element 30, which valve allows gassing and/or de-gassing of said tubular fixing element 30.

Furthermore, it is also possible to use the existing flow of inert gas according to arrow 39 for said fixing element 30. In this case, said inert gas 39 is used as a pressure medium to fill or expand said fixing element 30. Part of said inert gas 39 may be purposefully supplied to said fixing element 30 via said duct 47 or a feed line. Optionally, a pressure producer may be provided in addition to increase the necessary pressure of the inert gas flow.

FIGS. 3 to 8 show that said fixing element 30 is preferably provided in a recess 50 running all around and located on the outside 46 of said internal insert 28. Said recess 50 is shaped like a groove, and a limiting surface 51 of said recess 50 may have an opening 52 connected to said duct 47 or said feed line 40.

Optionally, said fixing element 30 is attached inside said recess 50, e.g. by adherence or by a mechanical connection via a coupling mechanism 45 simultaneously providing the necessary flow connection. It is not definitely required to have a separate connection between said internal insert 28 and said fixing element 30, because sufficient attachment in said recess 50 may already be achieved by simply inserting said ring-shaped fixing element 30 by pulling it onto said internal insert 28 using mechanical pre-stress.

It may be noted that said fixing element 30 may at least partly be made of heat-proof material, or a heat-insulating material may be provided on said internal insert 28, e.g. in said recess 50, so that proper function of said fixing element 30 will not be hindered by the heat in said gas nozzle 2 area.

In an individual embodiment, a receiving element 53 for one or more contact tube(s) 20 is provided inside or in an internal hollow space of said housing 35 of said tubular gas nozzle 2. Said receiving element 53 holds said contact tube(s) 20 inside said gas nozzle 2 in a defined or definable position. Said receiving element 53 is configured such that said contact tube(s) 20 are electrically insulated from said housing 35. If several contact tubes 20 are held by said receiving element 53, they are insulated against each other by said receiving element 53.

Preferably, in said receiving element 53 one recess 54, particularly a bore, is provided for each contact tube 20, and said tube(s) are attached in said recess(es). For example, said contact tube 20 may e.g. be pressed into said recess 54. It is also possible to screw, lock, etc. said contact tube 20 into said receiving element 53.

For the purpose of insulation, said receiving element 53 may be made of non-conducting insulating material, e.g. plastics, ceramics, etc. One or more insulating socket(s) or similar may be inserted into said recess 54 of said receiving element 53 to receive said contact tube(s). In this case, the body of said receiving element 53 may also be made of conducting material, e.g. metal.

FIG. 4 shows that the receiving element 53 is e.g. essentially shaped like a disc or plate. Said receiving element 53 is provided in the form of an insert 55 in said gas nozzle 2. Said insert 55 has at least one bore 57 extending throughout its entire width 56. The present invention will hereinafter be described in greater detail using the embodiment shown in FIG. 4, wherein two contact tubes 20 are held by insert 55, i.e. two bores 57 are provided in said insert 55.

Said insert 55 may either be integrally formed with said housing 35 of said gas nozzle 2, or it may be mounted as a separate component inside said gas nozzle 2. Said contact tubes 20a, 20b stick out from the narrow sides 58, 59 of said insert 55. Dimensions 60, 61 are of particular importance, defining the distances between exits 62, 63 of welding wires 21a, 21b from said contact tubes 20a, 20b, and the distance of said narrow side 59 of said insert 55 facing said exit opening 25 of said gas nozzle 2. The welding process may be considerably influenced by varying said distances 60, 61 because the stick-out lengths 23a, 23b of said welding wires 20a, 20b are changed. Generally, a welding process may be influenced in a variety of ways by varying said stick-out length 23, e.g. with respect to the melting volume of welding wire 20 and the gap bridging property on work piece 12.

In the present example, distances 60 and 61 are of different dimension. Distance 61 of said second contact tube 20b is smaller than distance 60 of said first contact tube 20a. This is advantageous if said welding torch 6 is held at an angle with respect to said work piece 12 (viz. angle 15 in FIG. 1) because the stick-out lengths 23a and 23b of welding wires 20a, 20b may be of about the same dimension and said welding torch 6 may be moved along surface 11 at a small distance 62. This will generally improve the welding process.

In this context, another individual embodiment of the present invention is particularly advantageous, namely a gas nozzle 2 for a multi-wire welding torch, particularly for a laser-hybrid welding process. The housing 35 of said gas nozzle 2 extends particularly in a rotationally symmetrical fashion along a longitudinal central axis 65. The first front surface 24 having exit opening 25 extends along a plane 66 being at an angle with respect to said longitudinal central axis 65. An angle 67 between a normal plane 68 orthogonal to said longitudinal central axis 65 and plane 66 is defined by the distances 60, 61 of contact tubes 20a, 20b. Said plane 66 or the front surface 24 extend from said external welding wire exit opening 62 of said first contact tube 20a towards a further welding wire exit opening 63 of said other contact tube 20b, which recesses by distance 69 in the direction of said longitudinal central axis 65 in the direction of said second front surface 26 of said gas nozzle 2.

Said angle 67 between said normal plane 68 and said oblique plane 66 is e.g. between 5° and 60°, preferably between 5° and 30°.

Such embodiment of gas nozzle 2, which is adapted to different distances of exits 62, 63 of two contact tubes 20a, 20b, improves access to the work piece 12 of said welding torch 6 if it is held at an angle, so a welding process using several melting welding wires may be optimized and flexibilized by varying said distance 64.

Another individual way of achieving the object of the present invention is also shown in FIGS. 4, 9, and 10. Said figures show a welding torch 6 or a contact tube 20, particularly for laser-hybrid welding processes, having components for arc welding using a melting electrode. One or more component(s) is/are formed by said contact tube 20 (contact tubes 20a and 20b) having a guiding bore 71 for said welding wire 21 extending along a longitudinal central axis 70 of said contact tube(s) 20. In the present invention it is essential that the longitudinal central axis 70 of said guiding bore 71 of said at least one contact tube 20 is at least partly curved, in other words, said guiding bore 71 does not extend completely straight but has an angle or curve in at least one section 72 of contact tube length 73. This embodiment will hereinafter be described with respect to a multi-wire welding process using two welding wires 21a, 21b, and two contact tubes 20a, 20b.

Contact tubes 20a, 20b each have an end area where exits 62, 63 of welding wires 21a, 21b are located. Section 72 is located in said end areas. In at least one of said contact tubes 20a, 20b said longitudinal central axis 70 or said guiding bore 71 have a curve or an angle. Preferably, both contact tubes 20a, 20b have an angle in section 72 with respect to the other parts of contact tube length 73. Thus, welding wires 21a, 21b do not exit parallel to said longitudinal axis 70 of said contact tubes 20a, 20b, but at an exit angle 74, 73 with respect to said longitudinal central axis 70. Thus, said welding wires 21a, 21b are moved forwarded in the direction of said work piece 12 at an angle with respect to said longitudinal central axis 65 of said gas nozzle 2. Said welding wires 21a and 21b converge in the direction of said work piece 12.

Said contact tubes 20a, 20b may each be rotatably held in a holding device 76a, 76b, particularly in one contact socket 77a, 77b each, to be rotatable around its longitudinal central axis 70. In particular, said contact tubes 20a, 20b may be rotatable at an angle of 360°. FIG. 4 shows that contact planes 78 of contact tubes 20a, 20b and contact planes 79 of contact sockets 77a, 77b, which are in contact to transmit current, may be twisted continuously with respect to each other under sliding friction. This will also change the angles 74, 75 of said curved contact tubes 20a, 20b and thus the exit directions of welding wires 21a, 21b, and the distance 80 between said exits 62, 63 will be changed as well. This means that adjusting angles 74, 75 or adjusting distance 80 may influence wire supply to the melting bath, thus providing an additional advantageous and simple way to influence the welding process.

Said receiving element 53 may have holding projections 81 in longitudinal direction for mounting said contact tubes 20a, 20b, which projections may e.g. have a stopping face 82 on which the respective contact tube 20a, 20b rests. Thus, said contact tubes 20a, 20b are fixed in the direction of said longitudinal central axis 70. Preferably, lamellae (not shown) are provided in said contact sockets 77a, 77b for better fixing.

Another way to change said exit angles 74, 75 or said distance 80 is to give the circumference of the outside or contact surface 78 of contact tubes 20a, 20b a polygonal shape that may fit in a congruent shape of contact surface 79 of contact socket 77. The number of possible positions, i.e. exit angles 74, 75, is determined by the number of edges or sides of said polygon. This allows changing the positions of said contact tubes 20a, 20b with respect to each other in steps. For example, a tetragonal or square shaft of contact tube 20 may be inserted into contact socket 77 in four positions, allowing four different exit angles 74, 75, of each welding wire 21a, 21b, i.e. 16 different distances 80 between exits 62, 63.

FIGS. 9 and 10 show and describe contact tube 20.

An individual way to achieve the objects of the present invention relates to a gas nozzle cap for a welding torch having a gas nozzle 2 and one or more contact tubes 20 corresponding to at least parts of the above description and thus forming a modular unit. This is advantageous for automatic handling of exchangeable components for cleaning or maintenance of the welding torch because fewer single parts have to be exchanged.

The present invention also relates to a method for the process control of a robot welding system described using FIGS. 1 and 6. Said welding system, which is used for line welding, is comprised of a welding device having a welding torch 6 or a laser-hybrid welding head 1, and a robot unit, and has a control device 83. Generally, said welding torch 6 is mounted on a robot arm 4 or manipulator, and the course of movement of said robot arm 4 is determined by said control device 83. In the exit area of welding wire 21, said welding torch 6 has a gas nozzle 2, which may be detached if necessary.

Optionally, at least one sensor 84 is assigned to said gas nozzle 2 and/or said internal insert 28, which sensor registers welding process parameters. Said sensor 84 is particularly meant to register parameters relating to material wear or soiling in the contact tube 20 area, particularly around exits 62, 63 of welding wire 21. In addition, said sensor 84 may optionally also register whether said gas nozzle 2 is correctly secured to or removed from said internal insert 28. Said sensor 84 is connected to the control device 83 of the welding device, which controls the welding process. If an inadmissible situation is detected, e.g. too much soiling, said control device 83 will start a maintenance procedure.

It must be noted that this maintenance procedure may also be started periodically at definable times or after a certain number of working steps without a sensor.

If a maintenance procedure of the welding process is started by said control device 83, said welding torch is brought to a maintenance position, then said control device deactivates the fixing element 30 for the gas nozzle 2 or the gas nozzle cap provided on said welding torch 6. The connection between said gas nozzle 2 and an internal insert 28 of said welding torch 6 is disconnected by spatially reducing the size of a fixing element 30 of said welding torch 6, and then said gas nozzle 2 is removed from said welding torch 6. Said gas nozzle 2 may be pulled off said internal insert 28 by means of a pull-off device, or said welding torch 6 is brought into a position at such an angle that said gas nozzle 2 naturally falls or slides out of said internal insert 28. Subsequently, another gas nozzle 2 is positioned on said welding torch 6 and mounted on said internal insert 28 via said fixing element 30. Fixing between said gas nozzle 2 and said internal insert 28 of said welding torch 6 is effected by spatial expansion of said fixing element 30, providing a particularly gas-tight connection.

The maintenance procedure is started by said control device 83 of said welding device generating a signal or signal sequence to control the drive of robot arm 4, so that said welding torch 6 is moved into the maintenance position. Moreover, a signal to control the supply device 40 is generated, thus determining the state of said fixing element 30, i.e. whether it is activated or deactivated. For example, valve 49 of said supply device 40 may be opened to deactivate said fixing element 30 to relieve excessive pressure acting in or on said fixing element 30 and thus reduce the volume of said fixing element 30 or remove said contact surface 31 of said fixing element 30 from the internal surface 29 of said gas nozzle 2. Moreover, the pressure producer 41, particularly pump 42, may be contacted to activate said fixing element 30 by producing excessive pressure and supplying it to said fixing element 30 via a feed line 43, whereupon said fixing element will at least partly extend or expand from a deflated or folded state. Thus, expansion of said fixing element 30 provides a non-positive, particularly frictional connection between said gas nozzle 2 and said internal insert 28.

It may be noted that a number of communicating control devices, e.g. of the welding device and of the robot control, may be involved in this process, but this will not be discussed here in greater detail.

In the maintenance position, said welding torch 6 is e.g. positioned in a robot system cleaning station not shown in detail. In said cleaning station replacement gas nozzles 2 are positioned at defined coordinates for robot control, and deposition positions for used gas nozzles 2 are defined, so that maintenance may be completely automatic.

FIG. 7 shows an embodiment of said welding torch 6 wherein the fixing element 30 is a tube 34.

Said tube 34 has a cavity 85 surrounded by an envelope 86 of thickness 87. Said envelope 86 has a contact surface 31 and an internal surface 44, which limits said cavity 85. Said envelope 86 is made of flexible material that is particularly yielding and elastic.

Said cavity 85 of said tube 34 is connected to the supply device 40, so that said internal surface 44 may be subjected to a force in the direction of arrow 37 as described above. For this purpose, said tube 34 has an opening 88 opening said cavity 85 to the outside, which opening is connected to duct 47 or supply line 43. Thus, said cavity 85 forms a pressure chamber.

To activate said fixing element 30, said cavity 85 of said tube 34 is filled with the pressure producing medium. This increases the volume of cavity 85, thus increasing the cross sectional area of said tube 34 until the contact surface 31 of said tube 34 is in sufficiently firm contact with said internal surface 29 of said gas nozzle 2 pushed on said internal insert 28.

Said tube 34 or the sealing element may e.g. be made of ethylene propylene diene monomer or silicone, rubber, plastic, glass or natural fibers, woven fabric or similar or of mixtures of these materials. Said tube 34 may be expansible and optionally elastic so that the envelope thickness 87 of said tube 34 decreases as the volume of said tube 34 increases.

Moreover, said tube 34 may be flexible but not expansible, so that said tube 34 folds when said fixing element 30 is in its deactivated state, i.e. when said cavity 85 of said tube 34 is degassed or emptied.

FIG. 8 shows another embodiment of welding torch 6 having a fixing element 30 to mount gas nozzle 2 on an internal insert 28. Here, said fixing element 30 is a membrane 89. Said membrane 89 is made of flexible material and has a contact surface 31 and an internal surface 44, and said contact surface is movable in the direction of the double arrow shown in the drawing. In order to expand said membrane 89, a force is applied to said internal surface 44 in the direction of arrow 37 so that said contact surface 31 is forced outside as described above. To achieve this, excessive pressure is applied below said internal surface 44, and the supply device 40 described above is effectively coupled with said membrane 89 for this purpose. Once said gas nozzle 2 is pushed on said internal insert 28, pressure is applied to said membrane 89 and a non-positive connection is established between said contact surface 31 of said membrane 89 and said internal surface 29 of said gas nozzle 2. Preferably, this connection is also gas-tight. The principle of this connection corresponds to the embodiments described in FIGS. 3 to 6, so that the components and embodiments described above may also be applied to the solution shown in FIG. 8.

As shown in the drawing, said membrane 89 is provided in a groove-like recess 50 running all around said internal insert 28. Said membrane 89 envelops the entire circumference of said internal insert 28 over section 36, so that said membrane 89 has the shape of a cylindrical tubular section. In marginal areas 90, 91 said membrane 89 rests on the limiting surface 51 in the form of a line or plane, forming contact points 92, 93, so that the entire circumference of said limiting surface 51 of recess 50 is enveloped. Contact points 92, 93 are gas-tight connections between said membrane 89 and said internal insert 28. In order to provide such contact points 92, 93, said membrane 89 may have connecting elements 94, e.g. annular pull elements acting like a spring forcing said marginal areas 90, 91 of said membrane 89 against said limiting surface 51 of said recess 50 inside said internal insert 28, or firmly bonding adhesive elements etc.

Said internal insert 28 may have a duct 47 opening into opening 52 of recess 89 below said internal surface 44 of said membrane 89. When activating said fixing element 30, pressure is transmitted via said duct 47 or said feed line 43 by applying excessive pressure to said internal surface 44 of said membrane 89, so that said membrane will expand in the direction of arrow 37. When deactivating said fixing element 30, said excessive pressure in duct 47 or in said feed line 43 is relieved.

Another embodiment may be mentioned that is not shown herein. In this embodiment the fixing element 30 has a mechanical pusher or similar which is displaceable in a guide by applying excessive pressure by means of a supply device 40, so that it engages with gas nozzle 2 and thus fixes it. Said engagement or fixing may be positive or non-positive.

FIGS. 9 and 10 show a contact tube 20 for a single or multi-wire welding torch 6 or a laser-hybrid single or multi-wire welding head 1. FIG. 9 shows said contact tube 20 in its original form, and FIG. 10 shows said contact tube 20 after working it to form a curve.

Said contact tube 20 has a throughout guiding bore 71 having a longitudinal central axis 70 for welding wire 21 and preferably a bore 95 concentric with said guiding bore 71 but having a larger diameter, as shown by a broken line. Moreover, as mentioned above, said contact tube 20 is of such a shape that said longitudinal central axis 70 of said guiding bore 71 of at least one contact tube 20 is curved at least in one section 72 of contact tube length 73.

In order to give said guiding bore 71 of said contact tube 20 a curve or an angle in the area of the exit 62 of welding wire 21, said contact tube 20 is first prepared straight as shown in FIG. 9. Subsequently, it is curved in an appropriate process step. For example, said contact tube 20 is fixed in a simple mould and pressure is applied to the external surface of said contact tube 20 in the front exit area 62 using an appropriate device (not shown), so that one section 72 of said contact tube 20 is deformed by a certain angle 74. The diameter in the front section 72 is smaller than in the area 96 behind it to allow defined deformation.

Moreover, a flowing radius is formed due to said curve, and therefore the welding wire 21 is easy to insert. Said guiding bore 71 for said welding wire 21 is preferably designed bigger than in conventional contact tubes 20. For example, if welding wire 21 has a diameter of 1.2 mm, said guiding bore will have a diameter of between 1.4 mm and 2 mm, preferably 1.6 mm. This also helps to reduce clotting of said contact tube, and said curve may be prepared by a deformation process because said welding wire 21 may still be inserted because of the larger diameter of said guiding bore 71 and said deformation.

According to the present invention, one contact tube front surface 97 is cut at an angle or may be beveled. Said contact tube front surface 97 has an angle of between 40° and 70°, preferably 45°, with respect to said longitudinal central axis 70. In this embodiment, the exit opening 62 is oval, which makes it considerably less likely for said exit opening 62 to become clotted with welding spatter. At the same time, the area of attack of said spatters is smaller, thus allowing longer use of said contact tube 20. Of course it is possible to use such beveled contact tube front surface 97 in a straight or curved contact tube 20.

The individual embodiments described above may be combined with each other. Moreover, the present invention may be applied to single wire welding torches 6 only having components such as e.g. a contact tube, a contact socket, etc., to transport one single welding wire 21, or the present invention may also be used for multi-wire welding torches having components to transport at least two welding wires 20. It will be obvious for a person skilled in the art that the present invention may be used for different numbers of welding wires.

In particular, the embodiments shown in FIGS. 1, 2, 3, 4, 5, 6, 7, and 8 may become the basis of individual solutions according to the present invention. The objects or problems and solutions according to the present invention are explained in the detailed descriptions of these figures.

The invention claimed is:

1. A single or multi-wire welding torch which can be connected to a welding device via a hose pack, the single or multi-wire welding torch comprising a torch handle, a tubular welding torch housing, at least one contact tube for welding wire, and a gas nozzle,
   wherein an internal insert for receiving said at least one contact tube and said gas nozzle is mounted in an end area of said tubular welding torch housing,
   wherein a fixing element is placed on said internal insert for producing a gas-tight connection between said internal insert and said gas nozzle pushed thereon,
   wherein said fixing element is made at least partially of a flexible material, with said gas-tight connection being establishable by spatial expansion of said fixing element, wherein a circumferential recess is provided on said internal insert, said circumferential recess having an opening connected with a supply device, wherein said fixing element is provided in said circumferential recess, wherein said internal insert has a body of insulating material, wherein at least one contact socket for electric energy transmission is provided in said body for receiving said at least one contact tube, and wherein said circumferential recess is located on an outside of the internal insert.

2. A laser-hybrid single or multi-wire welding head comprising:

at least one mounting element, and a first group of components on the at least one mounting element, the first group of components comprising a laser or a laser lens system, a crossjet and welding torch components for arc welding, said first group of components being connectable to a laser beam source and a welding device for melting wire welding processes via lines, wherein said welding torch components have an internal insert for receiving at least one contact tube and a gas nozzle, wherein a fixing element is provided on said internal insert for producing a gas-tight connection between said internal insert and said gas nozzle pushed thereon, and wherein said fixing element is made at least partially of a flexible material, with said connection being establishable by spatial expansion of said fixing element, wherein a circumferential recess is provided on said internal insert, said circumferential recess having an opening connected with a supply device, wherein said fixing element is provided in said circumferential recess, wherein said internal insert has a body of insulating material, wherein at least one contact socket for electric energy transmission is provided in said body for receiving said at least one contact tube, and wherein said circumferential recess is located on an outside of the internal insert.

3. The single or multi-wire welding torch according to claim 1, wherein said fixing element is formed by a deformable elastic hose or a sealing element.

4. The single or multi-wire welding torch according to claim 3, wherein said deformable elastic hose or said sealing element is made of ethylene propylene diene monomer or silicone.

5. The single or multi-wire welding torch according to claim 1, wherein said fixing element is formed by a membrane.

6. The single or multi-wire welding torch according to claim 1, wherein said fixing element is coupled with said supply device via said opening in said recess such that a deformable or yielding area of said fixing element is subjected to a pressure.

7. The single or multi-wire welding torch according to claim 6, wherein said supply device has a hydraulic or pneumatic pressure producing device.

8. The single or multi-wire welding torch according to claim 6, wherein said supply device is a hydraulic or pneumatic supply device, and wherein said fixing element is connected via said opening in said recess to a duct for a fluid, which duct is connected to said hydraulic or pneumatic supply device via a feed line.

9. The single or multi-wire welding torch according to claim 6, wherein said supply device is formed by an inert gas supply device of said welding device or is formed by a separate compressed air device.

10. The single or multi-wire welding torch according to claim 6, wherein said supply device is formed by a separate compressed air device, and wherein said separate compressed air device is provided to supply said fixing element and simultaneously to form a crossjet in a laser welding process.

11. The single or multi-wire welding torch according to claim 1, wherein the gas-tight connection is between a cylindrical interior surface of said gas nozzle and said internal insert and is frictional.

12. The single or multi-wire welding torch according to claim 1, wherein one section and/or contact surface of at least one of said fixing element and an internal surface of said gas nozzle is structured.

13. The single or multi-wire welding torch according to claim 1, wherein said at least one contact tube is pluggable.

14. The single or multi-wire welding torch according to claim 1, further comprising a sensor to monitor said gas nozzle.

15. The single or multi-wire welding torch according to claim 1, wherein said internal insert is made of two semispheres or a number of individual parts.

16. The single or multi-wire welding torch according to claim 1, wherein said tubular welding torch housing has an exit opening for a welding wire and, opposite, a receiving area for mounting on said internal insert, and wherein inside said tubular welding torch housing a receiving element is provided for said at least one contact tube, with said receiving element electrically insulating said at least one contact tube against said tubular welding torch housing.

* * * * *